United States Patent [19]
Shimizu

[11] Patent Number: 5,483,388
[45] Date of Patent: Jan. 9, 1996

[54] INFORMATION RECORDING AND REPRODUCING APPARATUS FORMING PLURAL KINDS OF ERROR DETECTION OR CORRECTION CODES

[75] Inventor: Tetsuya Shimizu, Yokohama, Japan

[73] Assignee: Canon Kabushiki Kaisha, Tokyo, Japan

[21] Appl. No.: 72,092

[22] Filed: Jun. 7, 1993

[30] Foreign Application Priority Data

Jun. 18, 1992 [JP] Japan .................................. 4-159766

[51] Int. Cl.$^6$ ............................... G11B 5/09; G11B 5/86
[52] U.S. Cl. .................................. 360/53; 360/15
[58] Field of Search ................... 360/15, 32, 53, 360/61

[56] References Cited

U.S. PATENT DOCUMENTS 4,775,897 10/1988 Umemoto et al. .................. 360/32
5,068,855 11/1991 Kashida et al. .................. 371/37.4
5,267,094 11/1993 Aoki .................................. 360/15

FOREIGN PATENT DOCUMENTS

0408343 1/1991 European Pat. Off. .
0415699 3/1991 European Pat. Off. .
0461787 12/1991 European Pat. Off. .

Primary Examiner—Aristotelis Psitos
Assistant Examiner—W. Chris Kim
Attorney, Agent, or Firm—Fitzpatrick, Cella, Harper & Scinto

[57] ABSTRACT

An information recording and reproducing apparatus includes an encoding circuit for encoding information codes and for adding redundant codes to the information codes to form error detection and/or correction codes, a recording and reproducing head for recording and reproducing the information codes and the redundant codes on and from the recording medium and a decoding circuit for detecting and/or correcting errors in reproduced information codes by using the redundant codes. The apparatus has an output terminal for externally outputting the information codes partially processed through the decoding circuit and only a part of the redundant codes.

21 Claims, 2 Drawing Sheets

INFORMATION RECORDING AND REPRODUCING APPARATUS FORMING PLURAL KINDS OF ERROR DETECTION OR CORRECTION CODES

FIELD OF THE INVENTION

This invention relates to an information recording and reproducing apparatus, especially an apparatus handling digital codes.

DESCRIPTION OF THE RELATED ART

A digital video tape recorder (hereinafter called "DVTR") is known as an example of the above mentioned recording and reproducing apparatus. A DVTR is sometimes called a digital video cassette recorder (hereinafter called "DVCR").

Firstly, a DVTR converts an analogue information signal, for example a signal including an analogue video signal and an analogue audio signal, to digital information codes. The digital information codes are supplied to an error correcting code encoding circuit. In the encoding circuit, parity codes for correcting code errors in the digital information codes are added to the digital information codes. Then the digital information codes and the parity codes are divided into synchronizing blocks each of which is composed of a predetermined number of the information codes and a predetermined number of the parity codes. The digital information codes and the parity codes are recorded on a recording medium by synchronizing blocks.

The digital information codes and the parity codes reproduced from the recording medium are supplied to an error correction code decoding circuit. The error correction code decoding circuit corrects error codes by using the parity codes. An error concealing circuit replaces uncorrectable error codes by interpolative codes.

For instance, codes representative of a value of a subject pixel are replaced by interpolative codes corresponding to an average value of two or more adjacent pixels to the subject pixel. In this way, codes which include codes corrected by the error correction code decoding circuit and interpolative codes formed by the error concealing circuit are supplied to a digital-to-analogue converter to generate analogue audio and visual signals which are externally outputted.

By using a pair of above-mentioned DVTRs, information codes recorded on a recording medium can be dubbed in another recording medium. In this case, deterioration of information can be prevented in case that output codes of the error concealing circuit in one DVTR (hereinafter called "master VTR") are directly supplied to the error correcting code coding circuit in the other DVTR (hereinafter called "slave VTR"). Accordingly, some DVTR have digital input and output terminals in addition to analogue input and output terminals.

However, in the above mentioned case, interpolative codes replacing uncorrectable codes in the master VTR are also supplied to the error correcting code coding circuit in the slave VTR. The error correcting code coding circuit equally handles the interpolative codes replacing uncorrectable codes, the codes corrected by using the parity codes, and no-error codes. Therefore the interpolative codes replacing uncorrectable codes and correct codes are equally recorded on a recording medium in the slave VTR.

Accordingly, the interpolative codes replacing uncorrectable codes and the correct codes are equally reproduced from the recording medium in the slave VTR. Then there is the possibility that uncorrectable codes newly occurred in a reproducing process are replaced by new interpolative codes formed by the interpolative codes replacing the uncorrectable codes.

Such replacement causes some deterioration in the quality of video and audio information, in other words the new interpolative codes are inferior because they are not only formed by original codes.

It is possible for all of the information codes and the parity codes recorded on one recording medium to be transmitted to the other recording medium without decoding error correction codes. However, in this case, uncorrectable codes increase with every dubbing. Especially, uncorrectable codes rapidly-increase with repeated dubbing, as the original images and sounds deteriorate.

There is a further problem in this case in that increasing the rate of transmitting codes from the master VTR to the slave VTR requires a high quality link between the master VTR and the slave VTR. This causes additional expense.

SUMMARY OF THE INVENTION

An object of the invention is to provide an apparatus, for recording and reproducing information codes which can solve all of the above mentioned problems. Broadly speaking, the invention provides a recording and reproducing apparatus to prevent deterioration of qualities of information caused by replacing uncorrectable codes with, interpolative codes formed by interpolative codes, and to restrain an increase in a rate of transmitting codes to another apparatus.

According to one aspect of the invention there is provided an information recording and reproducing apparatus in which information codes partially processed through error detection and/or correction code decoding means and only a part of redundant codes added to the information codes are outputted.

In another aspect, the invention provides an information recording and reproducing apparatus in which error detection and/or correction code encoding means entirely works on information codes inputted from first input means, but partially works on information codes and external redundant codes inputted from second input means.

In a further aspect, the invention provides an information recording and reproducing apparatus in which first output .-means externally outputs information codes partially processed through error detection and/or correction code decoding means, and second output means externally outputs information codes entirely processed through said decoding means.

Other inventive aspects and features of the invention will be apparent from the following description which refers to drawings, as will advantages of these aspects of the invention.

DETAILED DESCRIPTION OF THE PREFERRED EMBODIMENTS

Embodiments of the invention are described with reference to drawings as follows.

Figure 1:
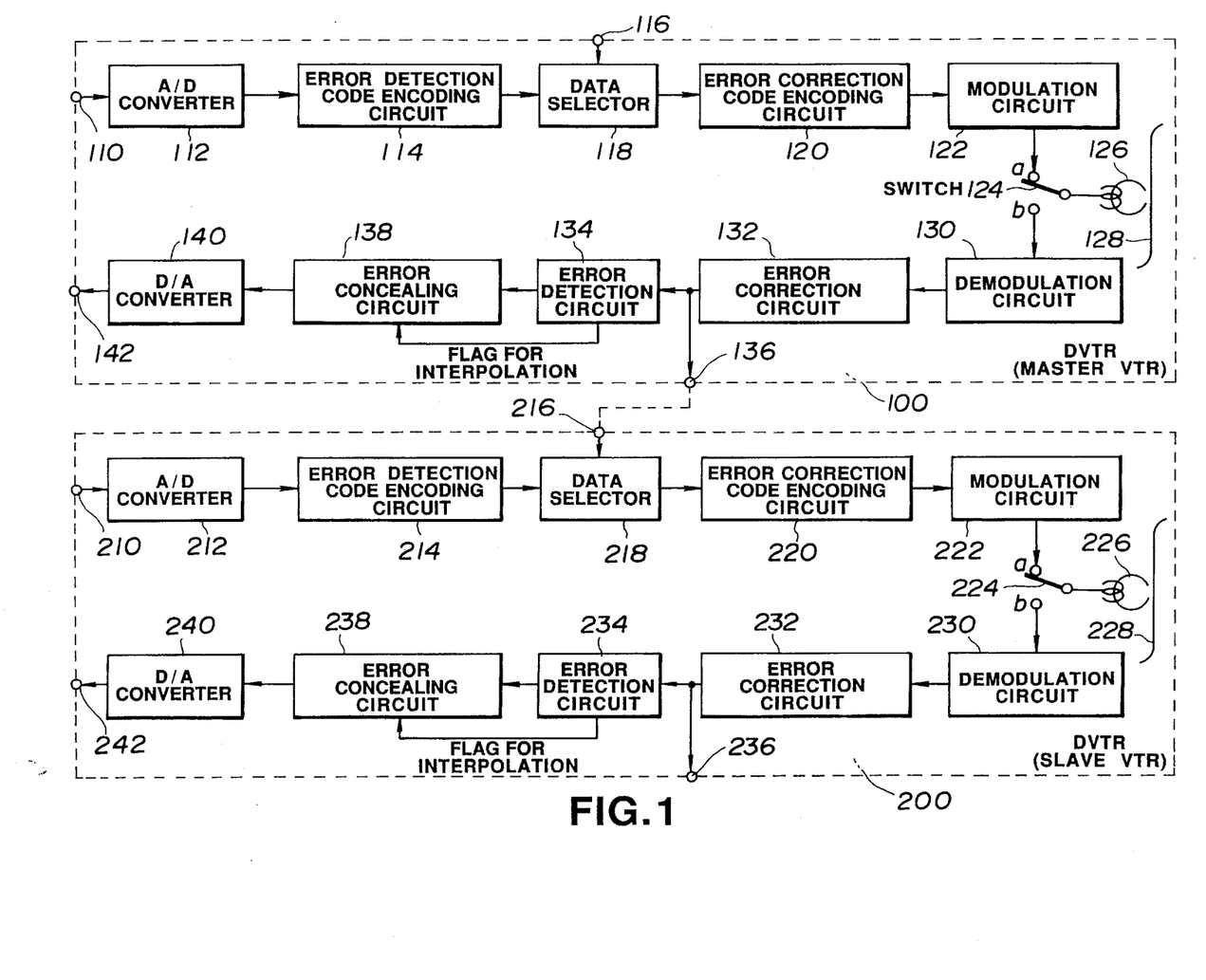
FIG. 1 shows a block diagram of a system composed of two DVTRs each of which relates to the invention.

FIG. 1 shows two DVTRs, 100, 200, according to the present invention connected to each other for dubbing. DVTR 100 is a master VTR, and DVTR 200 is a slave VTR.

DVTR 100 and DVTR 200 have a complete common structure. In FIG. 1, only blocks relating to recording and reproducing video information codes are illustrated, and blocks relating to recording and reproducing audio information codes are omitted.

In DVTR 100, 110 indicates an input terminal for an analogue video signal to be recorded. 112 indicates an analogue-to-digital converter (hereinafter called "A/D converter"). 114 indicates an error detection code encoding circuit for adding, as error detection codes, redundant codes to video codes outputted from the A/D converter 112. For instance, the error detection code an coding circuit adds CRCC (Cyclic Redundancy Check Code), as redundant codes, to the video codes.

116 indicates a further input terminal for inputting digital video codes and CRCC serially, as information codes and external redundant codes. The terminal 116 is available when DVTR 100 works to dub digital video signals. 118 indicates a data selector for selectively outputting codes from the terminal 116 and codes from the error detection code encoding circuit 114.

120 indicates an error correction code encoding circuit for error correction encoding the codes from the data selector 118. The error correction code encoding circuit 120 adds the parity check codes to the codes from the data selector 116 to form error correction codes. 122 indicates a modulation circuit for digital modulating all codes from the error correction code encoding circuit 120. 124 indicates a switch which connects a magnetic head 126 to "a" terminal in a recording mode and connects the head 126 to "b" terminal in a reproducing mode. The magnetic head 126 records and reproduces modulated codes on and from a magnetic tape 128.

130 indicates a demodulation circuit for digital demodulating codes from the switch 124 in the reproduction mode. 132 indicates an error correction circuit for decoding the error correction codes and correcting error codes in codes from the demodulation circuit 130 by using the parity check codes in the error correction codes. 134 indicates an error detection circuit for decoding the error detection codes for detecting error codes which are uncorrectable in the error correction circuit 132.

136 indicates an output terminal for outputting codes processed through the error correction circuit 132. 138 indicates an error concealing circuit for concealing the uncorrectable error codes by an interpolation according to an error flag output from the error detection circuit 134. 140 indicates a digital-to-analogue converter (hereinafter called "D/A converter") for converting codes processed through the error concealing circuit 138 to an analogue video signal, and 142 indicates an output terminal for externally outputting the analogue video signal obtained by the D/A converter 140.

All elements 210–242 in the DVTR 200 similarly work as the elements 110–142, and a detailed description about the elements 210–242 is omitted.

Detailed normal recording and reproducing operations of the DVTR 100 are as follows. Operation of the DVTR 200 is similar.

Figure 2:
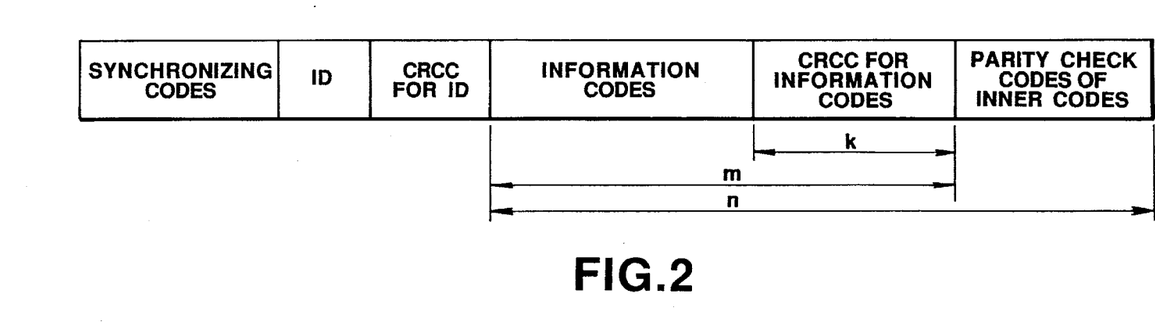
FIG. 2 shows a format for codes of one synchronizing block.
Figure 3:
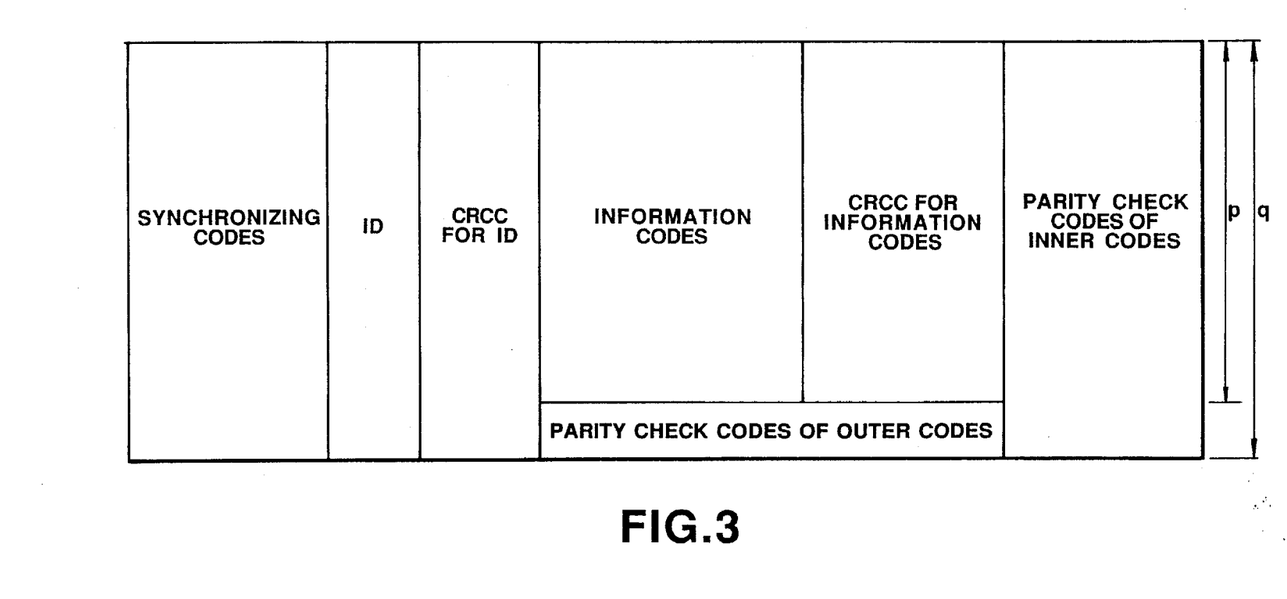
FIG. 3 shows a format for codes of one error corrective matrix.

FIG. 2 and FIG. 3 show a format for codes to be recorded. FIG. 2 shows codes of one synchronizing block, and FIG. 3 shows codes of one error corrective matrix.

The A/D converter 112 samples and digitizes the analogue video signal to form digital video codes each of which represents an amplitude of a pixel. The video codes obtained by the A/D converter 112 are supplied to the error detection code encoding circuit 114. For example, the error detection code encoding circuit 114 forms error detection codes by CRCC system using a 16 degrees forming polynomial expression, and adds the error detection codes to the video codes from A/D converter 112.

In FIG. 2, for example k=16, and 16 bits of error detection codes are added to (m-16) bits of the video codes.

The data selector 118 usually selects the codes from the error detection code encoding circuit 114, and selects the codes from the terminal 116 only when digital dubbing are carried out. In the normal recording mode, the data selector 118 outputs the video codes and error detection codes serially and supplies these codes to the error correction code encoding circuit 120.

The error correction code encoding circuit 120 forms parity check codes of an outer code at first, and forms parity check codes of an inner code according to a Reed-Solomon Product Coding method. The outer code is formed by adding ( q-P ) symbols of the parity check codes to P symbols of video (information) codes or P symbols of CRCC. The inner code is formed by adding (n-m) symbols of the parity check codes to (m-k) symbols of video codes and k symbols of CRCC. In short, outer code (q,P) and inner code (n,m) are formed as shown .as FIG. 2 and FIG. 3.

The modulation circuit 122 forms synchronizing blocks each of which is shown as FIG. 2. Each of the synchronizing blocks is formed by adding synchronizing codes, identification codes (hereinafter called "ID"), and CRCC (error detection codes) for ID to information (video) codes, CRCC for information codes, and parity check codes. Then the modulation circuit 122 modulates a code sequence composed continuous synchronizing blocks according to a well known digital modulating method.

In a recording mode, the DVTR 100 connects the magnetic head 126 to an "a" terminal of the switch 124, and output codes from the modulation circuit are supplied to the magnetic head 126 for recording on a magnetic tape 128.

In a reproducing mode, the DVTR 100 connects the magnetic head 126 to a "b" terminal of the switch 124, and codes reproduced by the magnetic head 126 are supplied to the demodulation circuit 130. The demodulation circuit 130 demodulates reproduced codes according to a well-known digital demodulating method and reads each symbols by using the synchronizing codes. The ID are also restored by the demodulation circuit 130.

Demodulated codes from the demodulation circuit 130 are supplied to the error correction circuit 132. The error correction circuit 132 decodes the inner code (n,m) and the outer code (q,P) in this due order, and corrects error codes that occurred in a magnetic recording and reproducing process within the limits of correcting ability of each error correction code.

Output codes from the error correction circuit 132 are composed of video (information) codes, CRCC for video codes and frame-synchronizing code consisting of one bit per one synchronizing block. The output codes from the error correction circuit 132 are supplied to the error detection circuit 134 and the output terminal 136.

The error detection circuit 134 detects whether errors being uncorrectable in the error correction circuit 132 have occurred or not, and also detects whether or not errors caused by a mis-correction of the error correction circuit have occurred. The error detection circuit 134 forms flags for an interpolation when the uncorrectable error codes and mis-corrected codes are detected. Further, the error detection circuit 134 supplies only video codes in codes supplied from error correction circuit 132 to the error concealing circuit 138.

The error concealing circuit 138 receives reproduced video codes from the error detection circuit 134, and replaces uncorrectable error codes or mis-corrected codes with interpolative codes formed by correct codes which correspond to pixels around a pixel to be replaced. The error concealing circuit 138 works according to the interpolation flags. Correct video codes pass through the error concealing circuit 138 according to said flags.

D/A converter 140 converts the video codes from the error concealing circuit 138 to an analogue video signal. In this way a reproduced analogue video signal is externally outputted from the output terminal 142.

Next, a system for dubbing digital codes without converting an analogue signal is described below. In this case, the output terminal 136 of DVTR 100 is connected to the input terminal 216 of DVTR 200 by a connecting suitable link, for example, a common axial cable.

In DVTR 100, recorded codes are reproduced from the magnetic tape 128 as usual, and the error correction circuit 132 corrects error codes included in the reproduced codes within the limits of a correcting ability thereof. The error correction circuit 132 outputs video codes, CRCC for video codes, and one bit for frame- synchronizing. In other words codes output from the error correction circuit 132 include information codes and a part of the redundancy codes.

These codes output from the error correction circuit 132 are supplied to an input terminal 216 of the DVTR 200 through the output terminal 136, and then these codes are supplied to an error correction code encoding circuit 220 through a data selector 218. Further, these codes are previously synchronized with synchronizing signals in DVTR 200 by a well-known method, for example a delay circuit.

The error correction code encoding circuit 220 of DVTR 200 encodes codes composed of video codes and CRCC which includes the uncorrectable error codes and the mis-corrected codes, and adds outer parity codes and inner parity codes to them. Codes encoded by the error correction code encoding circuit 220 are divided into the synchronizing blocks, and codes composed of the synchronizing blocks are modulated by a modulation circuit 222. Codes modulated by the circuit 222 are recorded by a magnetic head 126.

The manner in which codes dubbed in this way are reproduced from another recording medium is as follows. A reproduced output from the magnetic head is supplied to an error correction circuit 232 through a switch 224 and a demodulation circuit 230.

The error correction circuit 232 corrects error codes by using parity codes added by the error correction code encoding circuit 220. Now, the error correction circuit 232 recognizes that uncorrectable or mis-corrected error codes that occurred in DVTR 100 are correct codes. Therefore, video codes outputted from the error correction circuit includes uncorrectable or mis-corrected error codes that occurred in DVTR 100 and uncorrectable or mis-corrected error codes that occurred in DVTR 200.

An error detection circuit 234 detects code errors included in reproduced video codes outputted from the error correction circuit 232 by using CRCC as error detection codes. The error detection codes decoded by the error detection circuit 234 are added by the error detection code encoding circuit 114 in DVTR 100, and are formed from correct video codes to be recorded on the magnetic tape 128.

Accordingly, the error detection circuit 234 detects not only uncorrectable error codes in the error correction circuit 232 but uncorrectable or mis-corrected error codes that occurred in DVTR 100. All of the error codes detected by the error detection circuit 234 are replaced with interpolative codes in an error concealing circuit 238. In other words, flags for interpolation are given to uncorrectable or mis-corrected error codes that occurred in both the DVTR 100 and the DVTR 200.

The error concealing circuit 238 replaces such error codes with codes corresponding to pixels closed to a pixel corresponding to the error codes according to the flags for interpolation provided by the error detection circuit. A D/A converter 240 converts digital video codes outputted from the error concealing circuit 238 to an analogue video signal. In this way, a reproduced analogue video signal reproduced from the dubbed magnetic tape are externally outputted from an output terminal 242.

Above description relates to only embodiments which use a magnetic tape. However, this invention is capable of being applied to other embodiments which use other recording mediums, for example, a magnetic disk, an optical disk, an optical-magnetic disk, a semi-conductor memory and so on. This invention can also be usefully applied to a system that can dub digital codes between different kinds of recording mediums.

As mentioned above, embodiments to which this invention applies are able to reduce increases in the transmission rate between two apparatuses. This is because the embodiments output information codes partially processed through error detection and/or correction code decoding means and only a part of redundant codes added to the information codes.

Additionally, the embodiments are able to prevent deterioration of quality of information, because the embodiments form interpolative codes to replace error codes by only using original correct codes.

I claim:

1. An information recording and reproducing apparatus, comprising:

encoding means for encoding an information signal, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes from the recording medium;

decoding means for decoding the error detection and correction codes to detect and correct errors in the information signal reproduced by said reproducing means by using the redundant codes reproduced by said reproducing means and having a plurality of outputs; and first output means for externally outputting from one of said plurality of outputs the information signal partially processed through said decoding means and only a part of the redundant codes.

2. An apparatus according to claim 1, further comprising second output means for externally outputting the information signal entirely processed through said decoding means.

3. An apparatus according to claim 1, further comprising a first input terminal for inputting only an information signal, and wherein said encoding means entirely works on the information signal inputted from said first input terminal.

4. An apparatus according to claim 3, further comprising a second input terminal for inputting an information signal and redundant codes serially, and wherein said encoding means partially works on the information signal and the redundant codes inputted from said second input terminal.

5. An apparatus according to claim 1, wherein said encoding means includes a first encoding circuit for adding first redundant codes to the information signal to form error detection codes and a second encoding circuit for adding second redundant codes to the information signal to form error correction codes.

6. An apparatus according to claim 5, wherein said decoding means includes a first decoding circuit for detecting and concealing errors in the information signal by using the first redundant codes and a second decoding circuit for correcting errors in the information signal by using the second redundant codes, and wherein said output means externally outputs the information signal processed through said second decoding circuit and the first redundant codes.

7. An apparatus according to claim 6, further comprising second output means for externally outputting the information signal processed through said first and second decoding circuits.

8. An apparatus according to claim 5, further comprising a first input terminal for inputting only an information signal, and wherein said first encoding circuit receives the information signal input from said first input terminal.

9. An apparatus according to claim 8, further comprising a second input terminal for inputting an information signal and external redundant codes serially, wherein said encoding means further comprises a code selector for selectively outputting codes from said first encoding circuit and codes from said second input terminal, and said second encoding circuit receives codes from said code selector.

10. An apparatus according to claim 5, wherein the error detection codes include Cyclic Redundancy Check Codes and the error correction codes include parity codes.

11. An apparatus according to claim 1, wherein the information signal includes a digital video signal which is produced by sampling an analogue video signal.

12. An information recording and reproducing apparatus, comprising:

first input means for inputting only an information signal;

second input means for inputting an information signal and external redundant codes;

encoding means for encoding the information signal input by one of said first and second input means, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes from the recording medium;

decoding means for decoding the error detection and correction codes to detect and correct errors in the information signal reproduced by said reproducing means by using the redundant codes reproduced by said reproducing means; and output means for externally outputting the information signal processed through said decoding means, wherein said encoding means is capable of working entirely using the information signal inputted from said first input means, and said encoding means is capable of working partially on the information signal and external redundant codes inputted from said second input means.

13. An apparatus according to claim 12, wherein said encoding means includes a first encoding circuit for adding first redundant codes to the information signal inputted from said first input means to form error detection codes and a second encoding circuit for adding second redundant codes to the information signal from said first encoding circuit to form error correction codes.

14. An apparatus according to claim 13, wherein said encoding means further includes a code selector for selectively outputting codes from said first encoding circuit and codes from said second input means, and said second encoding circuit receives codes from said code selector.

15. An information recording and reproducing apparatus, comprising:

input means for inputting an information signal;

encoding means for encoding the information signal inputted from said input means, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes from the recording medium;

decoding means for decoding the error detection and correction codes to detect and correct errors in the information signal reproduced by said reproducing means;

first output means for externally outputting the information signal, errors of which are corrected by decoding the error correction code but not the error detection code; and second output means for externally outputting the information signal, errors of which are corrected and detected by decoding both the error detection and correction codes.

16. An apparatus according to claim 15, wherein the redundant codes includes first redundant codes added to the information signal to form error detection codes and second redundant codes added to the information signal to form error correction codes, said decoding means including a first decoding circuit for detecting errors in the information signal by using the first redundant codes and a second decoding circuit for correcting errors in the information signal by using the second redundant codes, and wherein said first output means outputs the information signal processed through said second decoding circuit and the first redundant codes.

17. An information recording and reproducing apparatus, comprising:

a plurality of input terminals for inputting information signals;

selecting means for selecting one of the plurality of input terminals;

encoding means for encoding an information signal inputted from a selected one of the input terminals to form error detection and correction codes and outputting the information signal;

recording means for recording the information signal outputted from said encoding means on a recording medium; and reproducing means for reproducing the information signal from the recording medium, said encoding means being operable in a first mode for forming both the error detection and correction codes and a second mode for forming the error correction code but not the error detection code, said first and second modes being changed according to a condition of the input terminals.

18. An information recording and reproducing apparatus, comprising:

encoding means for encoding an information signal, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes from the recording medium;

a plurality of output terminals for outputting the information signal; and decoding means for decoding the error detection and correction codes to detect and correct errors in the information signal reproduced by said reproducing means, said decoding means being operable in a first mode for decoding both the error detection and correction codes and a second mode for decoding the error correction Code but not the error detection code, and wherein the first and second modes are changed according to a condition of the output terminals.

19. An information recording and reproducing apparatus, comprising:

input means for inputting an information signal;

encoding means for encoding the information signal inputted from said input means to form error detection and correction codes and outputting the information signal;

recording means for recording the information signal outputted from said encoding means on a recording medium; and reproducing means for reproducing the information signal from the recording means, the apparatus being operable in a normal recording mode in which said encoding means forms both the error detection and correction codes, and a dubbing mode in which said input means inputs an information signal reproduced from another recording medium and said encoding means forms the error correction code but not the error detection code.

20. An information recording and reproducing apparatus, comprising:

encoding means for encoding an information signal, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes from the recording medium;

decoding means for decoding the error detection and correction codes to detect and correct errors in the information signal reproduced by said reproducing means; and output means for outputting the information signal, wherein said apparatus is operable in a normal reproducing mode in which said decoding means decodes the error detection and correction codes, and a dubbing mode in which said output means outputs an information signal to be recorded on another recording medium and said decoding means decodes the error correction code but not the error detection code.

21. An information recording and reproducing apparatus, comprising:

encoding means for encoding an information signal, said encoding means adding redundant codes to the information signal to form error detection and correction codes and outputting the information signal and the redundant codes;

recording means for recording the information signal and the redundant codes outputted from said encoding means on a recording medium;

reproducing means for reproducing the information signal and the redundant codes;

decoding means for detecting and correcting errors in the information signal reproduced by said reproducing means; and output means for outputting the information signal, said output means further outputting only a part of the redundant codes reproduced by said reproducing means with the information signal to be recorded on another recording medium.

* * * * *

UNITED STATES PATENT AND TRADEMARK OFFICE
CERTIFICATE OF CORRECTION

PATENT NO. : 5,483,388

DATED : January 9, 1996

INVENTOR(S): TETSUYA SHIMIZU

It is certified that error appears in the above-identified patent and that said Letters Patent is hereby corrected as shown below:

COLUMN 1

Line 52, "DVTR" should read --DVTRs--.

COLUMN 2

Line 14, "rapidly-increase" should read --rapidly increase--.
    Line 27, "with," should read --with--.
    Line 45, ".-means" should read --means--.
    Line 67, "drawings" should read --the drawings--.

COLUMN 3

Line 14, "an coding" should read --encoding--.
    Line 16, "to-the" should read --to the--.
    Line 27, "116" should read --118--.

COLUMN 4

Line 2, "10" should be deleted.
    Line 12, "are" should read --is--.
    Line 34, "continuous" should read --of continuous--.
    Line 45, "symbols" should read --symbol--.

UNITED STATES PATENT AND TRADEMARK OFFICE
CERTIFICATE OF CORRECTION

PATENT NO. : 5,483,388

DATED : January 9, 1996

INVENTOR(S): TETSUYA SHIMIZU

It is certified that error appears in the above-identified patent and that said Letters Patent is hereby corrected as shown below:

<u>COLUMN 5</u>

Line 27, "frame- synchronizing." should read --frame-synchronizing.--.
    Line 57, "includes" should read --include-.

<u>COLUMN 6</u>

Line 10, "closed" should read --close--.
    Line 16, "are" should read --is--.
    Line 22, "semi-conductor" should read --semiconductor--.

<u>COLUMN 8</u>

Line 43, "includes" should read --include--.

UNITED STATES PATENT AND TRADEMARK OFFICE
CERTIFICATE OF CORRECTION

PATENT NO. : 5,483,388

DATED : January 9, 1996

INVENTOR(S) : TETSUYA SHIMIZU

It is certified that error appears in the above-identified patent and that said Letters Patent is hereby corrected as shown below:

<u>COLUMN 9</u>

Line 31, "Code" should read --code--.

Signed and Sealed this

Fourth Day of June, 1996

Attest:

BRUCE LEHMAN

*Attesting Officer*     *Commissioner of Patents and Trademarks*